United States Patent
Parekh et al.

(10) Patent No.: US 9,966,755 B2
(45) Date of Patent: May 8, 2018

(54) PREVENTING WATER DAMAGE IN PORTABLE DEVICES

(71) Applicant: NVIDIA CORPORATION, Santa Clara, CA (US)

(72) Inventors: Hardik Jagdishbhai Parekh, Rajkot (IN); Neel Kumarbhai Patel, Junagadh (IN)

(73) Assignee: NVIDIA Corporation, Santa Clara, CA (US)

(*) Notice: Subject to any disclaimer, the term of this patent is extended or adjusted under 35 U.S.C. 154(b) by 0 days. days.

(21) Appl. No.: 13/897,041

(22) Filed: May 17, 2013

(65) Prior Publication Data

US 2014/0344962 A1    Nov. 20, 2014

(51) Int. Cl.
*G06F 21/81* (2013.01)
*H02H 5/08* (2006.01)

(52) U.S. Cl.
CPC ............. *H02H 5/083* (2013.01); *G06F 21/81* (2013.01)

(58) Field of Classification Search
CPC .......... H02H 5/083; G06F 21/81; G06F 21/70
See application file for complete search history.

(56) References Cited

U.S. PATENT DOCUMENTS

| | | | |
|---|---|---|---|
| 4,246,493 A * | 1/1981 | Beeghly | 307/66 |
| 7,797,772 B2 * | 9/2010 | Bonatz | 5/9.1 |
| 2005/0286925 A1 * | 12/2005 | Yoshida | G06F 1/30 399/88 |
| 2007/0084808 A1 * | 4/2007 | Williamson et al. | 210/806 |
| 2010/0164474 A1 * | 7/2010 | Oglesbee et al. | 324/71.1 |
| 2011/0183685 A1 * | 7/2011 | Burton et al. | 455/456.1 |
| 2012/0106017 A1 * | 5/2012 | Schumacher et al. | 361/114 |

* cited by examiner

*Primary Examiner* — John B King
*Assistant Examiner* — Arya Golriz
(74) *Attorney, Agent, or Firm* — Artegis Law Group, LLP

(57) ABSTRACT

A shut-off circuit interrupts the flow of power to the system circuit of a portable device, when liquids are detected within the portable device. Liquid sensors are placed proximate to the ports of the portable device. The ports may admit the flow of liquids, so the liquid sensors may detect the passage of liquids into the portable device. If the liquid sensors detect liquids entering the portable device, a shut-off circuit interrupts the flow of power from the battery to the system circuit.

16 Claims, 3 Drawing Sheets

PREVENTING WATER DAMAGE IN PORTABLE DEVICES

BACKGROUND OF THE INVENTION

Field of the Invention

Embodiments of the invention generally relate to electronic devices and, more specifically, to techniques for preventing water damage in portable devices.

Description of the Related Art

A typical circuit is configured to control the flow of power through components, such as resistors, transistors, and capacitors. Connectors, such as conductive wires or traces, connect the components to one another, and power flows through the connectors. The components and connectors are typically arranged within a substrate of high resistance. Power flows through the material with the least resistance, so the power flows through the connectors instead of the substrate. The placement of components and connectors within the substrate determines the desired path for the power to follow.

Components and connectors are configured to operate with certain amounts of power. Under normal operation, the circuit is designed to only expose a component or a connector to the amount of power that the component or connector can handle. If the component or connector were exposed to too much power, then the circuit could be damaged. For instance, if a resistor were exposed to more power than the resistor can handle, then the resistor could overheat and the resistor as well as surrounding portions of the circuit could melt and become non-operational.

Typically, liquids, such as water, have less resistance than the desired path for the power through the circuit. Liquids on the surface of the circuit can create unintended paths across the circuit with little resistance. The liquids thereby form what is known as a short-circuit and the power may follow the short-circuit. The short-circuit may expose components of the circuit to more power than those components can handle, thereby damaging the components and making the circuit non-operational.

The proliferation of portable devices that operate from battery power, such as cellular telephones, has made damage to circuits from exposure to liquids more common. For instance, a user oftentimes carries a cellular telephone into environments with water. If the user accidentally drops the cellular telephone into the water, then the water could form a short-circuit within the cellular telephone. The flow of power through the short-circuit could damage components and circuits within the cellular telephone. This damage could make the cellular telephone non-operational. The user would then have to replace the cellular telephone. The user could also lose valuable data, such as contacts, settings, and messages stored within the damaged cellular telephone.

As the foregoing illustrates, what is needed in the art is a technique for preventing damage to portable devices that are exposed to liquids.

SUMMARY OF THE INVENTION

One embodiment of the present invention sets forth a method for preventing a portable computing device from being damaged by liquid. The method includes detecting the presence of a liquid within the portable computing device, and, in response, interrupting power flow to a system circuit via a shut-off circuit to prevent a short circuit within the system circuit.

Advantageously, a shut-off circuit protects a portable device from damage through exposure to liquids. More specifically, without power flowing to the system circuit, short-circuits, resulting from liquid exposure that could potentially damage electronic components or circuitry internal to the portable device, are prevented.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
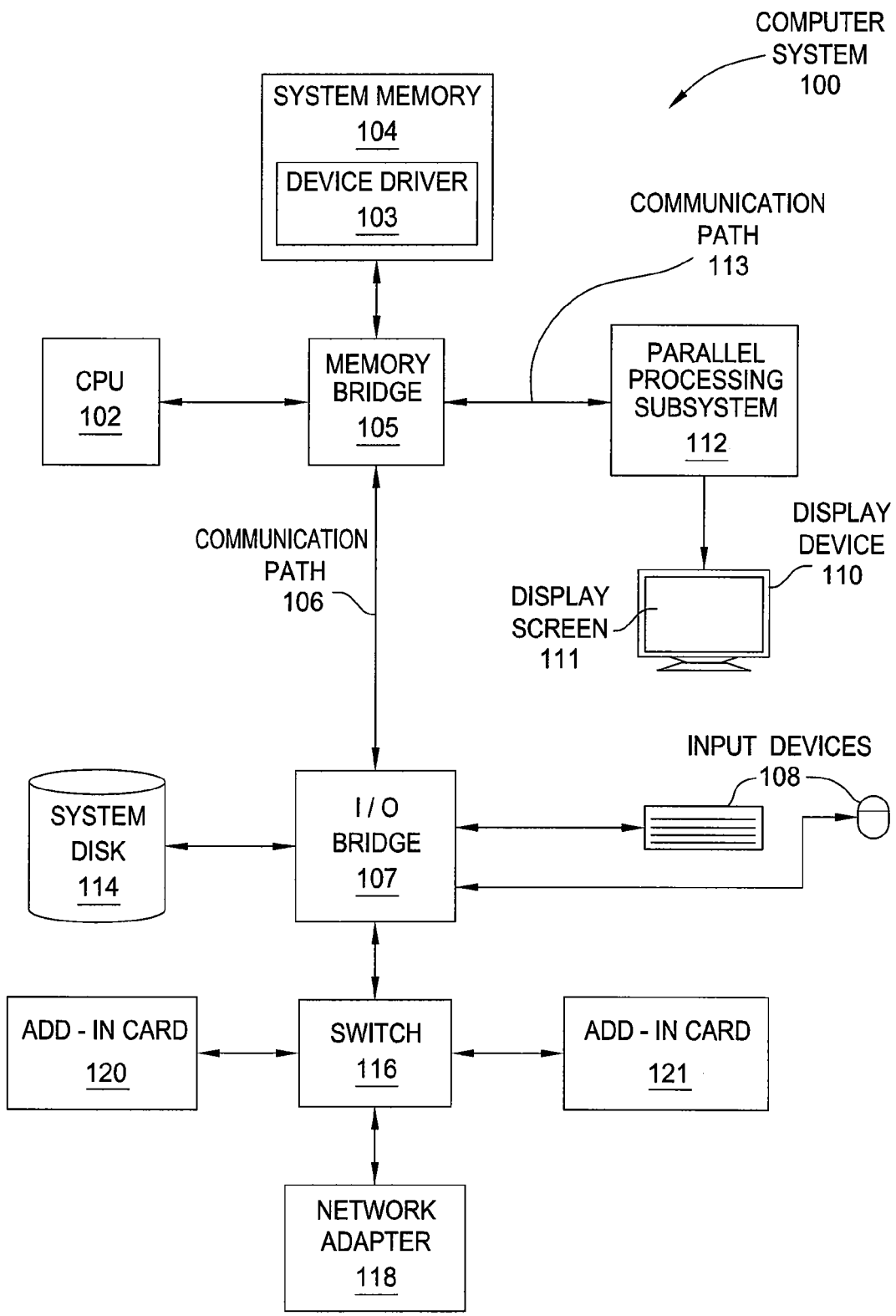
FIG. 1 is a block diagram illustrating a computer system configured to implement one or more aspects of the present invention.

FIG. 1 is a block diagram illustrating a computer system 100 configured to implement one or more aspects of the present invention. As shown, the computer system 100 includes a central processing unit (CPU) 102 and a system memory 104 that includes a device driver 103. CPU 102 and system memory 104 communicate via an interconnection path that may include a memory bridge 105. Memory bridge 105, which may be, e.g., a Northbridge chip, is connected via a bus or other communication path 106 (e.g., a HyperTransport link) to an input/output (I/O) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a peripheral component interconnect (PCI) express, Accelerated Graphics Port (AGP), or HyperTransport link); in one embodiment parallel processing subsystem 112 is a graphics subsystem that delivers pixels to a display device 110 (e.g., a conventional cathode ray tube (CRT) or liquid crystal display (LCD) based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. Communication paths interconnecting the various components in FIG. 1 may be implemented using any suitable protocols, such as PCI, PCI Express (PCIe), AGP, HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
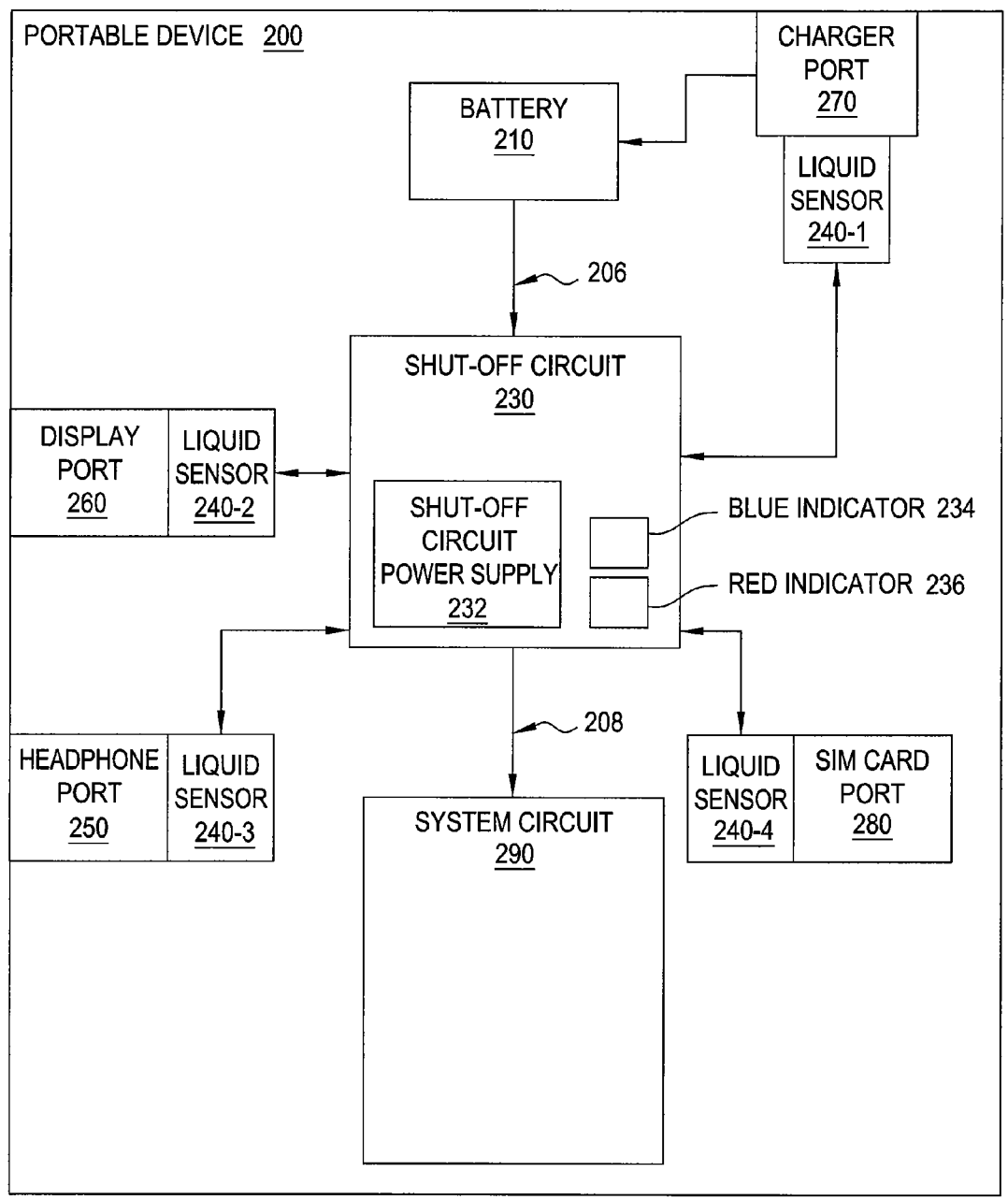
FIG. 2 is a block diagram of a portable device configured to interrupt the flow of power in the presence of liquids, according to one embodiment of the present invention.

FIG. 2 is a block diagram of a portable device 200 configured to interrupt the flow of power in the presence of liquids, according to one embodiment of the present invention. The portable device 200 may be a mobile device, such as a cellular telephone, a tablet computer, or a digital camera.

As shown, portable device 200 includes a battery 210, a shut-off circuit 230, a headphone port 250, a display port 260, a charger port 270, a subscriber identity module (SIM) card port 280, and a system circuit 290. The shut-off circuit 230 includes a shut-off circuit power supply 232, a blue indicator 234, and a red indicator 236. The shut-off circuit 230 is coupled to the battery 210 via connection 206 and coupled to the system circuit 290 via connection 208. System circuit 290 is configured to draw power from battery 210 via connections 206 and 208. Shut off circuit 230 is configured to control the power that system circuit 290 draws from battery 210, as described in greater detail below.

Various liquid sensors 240 reside adjacent to the different ports included within portable device 200. A liquid sensor 240-1 resides adjacent to charger port 270, a liquid sensor 240-2 resides adjacent to display port 260, a liquid sensor 240-3 resides adjacent to charger port 270, and a liquid sensor 240-4 resides adjacent to SIM card port 280. Liquid sensors 240 are coupled to the shut-off circuit 230 and configured to detect the presence of liquids. When a given liquid sensor 240 detects the presence of liquid in an adjacent port, that liquid sensor 240 is configured to notify the shut-off circuit 230. In response, the shut-off circuit 230 is configured to interrupt the flow of power from the battery 210 to the system circuit 290, thereby protecting the system circuit 290 from damage, as also described in greater detail below.

The system circuit 290 may include some or all of the same elements shown in FIG. 1. The system circuit 290 may be configured as a SoC or a collection of components and connectors organized on a printed circuit board (PCB). The system circuit 290 may be configured to perform a wide range of different processing operations. For instance, if the portable device 200 is a cellular telephone, then the system circuit 290 could be configured to process phone calls, short messaging service (SMS) communications, and notifications. The portable device 200 could also process email, perform web browsing, and execute user applications in response to input from a user. The system circuit 290 receives power from the shut-off circuit 230 through connection 208. The connector 208 may be a trace on a PCB. As mentioned above, the system circuit 290 is configured to draw power from the battery 210 via connections 206 and 208.

The battery 210 is configured to store power received from the charger port 270 and to provide power to the system circuit 290. The battery 210 may be a rechargeable lithium-ion battery. The battery 210 may include a charge controller to control the power received from charger port 270. The charge controller may accept power from the charger port 270 at a voltage, such as 5V, and supply power within the battery 210 and to the system circuit 290 at another voltage, such as 3.7V. The charge controller may also be located outside the battery 210.

The charger port 270 is configured to accept power from an external connector. The charger port 270 may be a micro universal serial bus (micro-USB) receptacle. In such a case, the charger port 270 may include connections for serial data transmission as well as connections for power. The charger port 270 includes at least one connection to accept positive electric voltage and at least one connection to accept ground or negative voltage. The charger port 270 may be located along the edge of the portable device 200, so that the user can insert a connector into the charger port 270. The charger port 270 is coupled to the battery 210.

The display port 260 is configured to output video or video and audio data from the portable device 200 to an external display. The display port 260 may be a micro high-definition multimedia interface (micro-HDMI) connector. The display port 260 may be located along an edge of the portable device 200, so that the user can insert a connector into the display port 260.

The headphone port 250 is configured to output audio data and may be configured to receive audio data input. The headphone port 250 may be a 3.5 mm stereo jack with three connectors. Two of the three connectors may output stereo audio data for external speakers, such as headphones. The third connector may receive audio data input from an external audio source, such as a microphone. The headphone port 250 may be located along an edge of the portable device 200, so that the user can insert a connector into the headphone port 250.

The SIM card port 280 is configured to accept SIM cards. A SIM card stores information for identifying the portable device 200 on a network, such as a cellular telephone network. The SIM card port 280 may be located along the edge of the portable device 200 or proximate to the battery 210 within the portable device 200. In other embodiments, the portable device 200 may also include a secure digital (SD) memory card port in addition to or instead of a SIM card port 280. The SD memory card provides non-volatile memory that may allow the storage of additional data within the portable device 200.

As a general matter, each of the previously described ports is an opening through which the interior of the portable device 200 may be accessed. In certain situations this access is intended by the user, such as when the user inserts a SIM card into SIM card port 280. However, the ports described above may also provide liquids with access to the interior of the portable device 200. For example, if the portable device 200 were dropped into a pool of water, then the water may flow through the SIM card port and contact system circuit 290. If such a situation were to arise, system circuit 290 may be at risk of being damaged. However, as mentioned above, liquid sensors 240 that reside adjacent to the different ports described herein are configured to detect the presence of liquids and to notify shut-off circuit 230. Again, shut-off circuit 230 is configured to respond by shutting off system circuit 290 by interrupting the flow of power to the system circuit 290, thereby avoiding possible damage that may be caused by power flowing through short-circuits created by those liquids.

The liquid sensors 240 are configured to transmit signals to the shut-off circuit 230 that indicate the presence or absence of liquids. The liquid sensors 240 may determine the presence or absence of liquids by performing a measurement that reflects the presence or absence of liquids. The liquid sensors 240 are configured to use the result of the measurement to determine the type of signal to transmit, such that the liquid sensor 240 transmits one signal when the measurement indicates that fluids are present and a second signal when the measurement indicates that fluids are not present.

In one embodiment, the liquid sensors 240 may include an emitting element, such as an infrared light emitting diode (LED) that emits infrared radiation, and a receiver that detects infrared radiation. The emitting element and receiver may be configured such that a liquid disposed between the emitting element and receiver blocks the infrared radiation. The liquid sensor 240 may identify the presence or absence of liquids, and then determine the corresponding signal to transmit to the shut-off circuit 230 based on the amount of infrared radiation measured by the receiver. Persons skilled in the art will recognize that many technically feasible techniques exist for determining the presence of liquids.

The shut-off circuit 230 is configured to control the flow of power to the system circuit 290 based on the signals received from the sensors 240. In particular, the shut-off circuit 230 determines whether to interrupt the flow of power based upon the signals received from the liquid sensors 240. The shut-off circuit 230 is configured to combine the signals received from the liquid sensors 240 together to make this determination.

In one embodiment, the shut-off circuit 230 may include an "AND" gate configured to "and" the signals from the liquid sensors 240, thereby providing an indication of the presence of liquids within the portable device 200. Thus, when the shut-off circuit 230 receives signals indicating that liquids are not present from all of the liquid sensors 240, the shut-off circuit 230 may determine that liquids are not present within the portable device 200 and connect power to the system circuit 290. If the shut-off circuit 230 receives a signal indicating that liquids are present from at least one liquid sensor 240, then the shut-off circuit 230 may determine that liquids are present within the portable device 200 and interrupt the flow of power to the system circuit 290. If the shut-off circuit 230 interrupts the flow of power, then the portable device 200 may turn off.

As previously mentioned, the shut-off circuit 230 interrupts the flow of power to the system circuit 290 to avoid possible damage to the system circuit 290. If liquids in contact with system circuit 290 create short-circuits across the system circuit 290 while the shut-off circuit 230 interrupts the flow of power, those short circuits may be harmless since the system circuit itself 290 is not powered. Accordingly, damage to the components of the system circuit 290 may be avoided. Once the shut-off circuit 230 receives signals indicating that liquids are not present from all of the liquid sensors 240, then the shut-off circuit 230 reconnects the flow of power from the battery 210 to the system circuit 290.

In one embodiment, the shut-off circuit 230 may control the flow of power with a transistor. The shut-off circuit 230 may turn on the transistor to connect the flow of power and turn off the transistor to interrupt the flow of power. Persons skilled in the art will recognize that many technically feasible techniques exist for controlling the flow of power through the shut-off circuit 230.

The shut-off circuit 230 may also be configured to indicate the presence of liquids within the portable device 200 to the user. The shut-off circuit 230 indicates the presence of liquids within the portable device 200 by activating the red indicator 236. The shut-off circuit 230 keeps the red indicator 236 activated until the shut-off circuit 230 determines that liquids are no longer present within the portable device 200. The red indicator 236 warns the user that if the portable device 200 were powered on, then the system circuit 290 could be damaged. In one embodiment, the user may power on the portable device 200 despite the red indicator being activated, thereby overriding the shut-off circuit 230 and forcing power to be reconnected to system circuit 290. Once the shut-off circuit 230 determines that liquids are not present, the shut-off circuit 230 activates the blue indicator 234. The blue indicator 234 indicates that power has been reconnected to the system circuit 290, and that the user may safely turn the portable device 200 back on, then the system circuit 290 would not be damaged. The red indicator 236 and blue indicator 234 may be LEDs.

The shut-off circuit power supply 232 is configured to power the shut-off circuit 230 and the liquid sensors 240. The shut-off circuit power supply 232 stores power from the battery 210. If the flow of power from the battery 210 is interrupted, then the shut-off circuit power supply 232 provides power, until the flow of power from the battery 210 is reconnected. For instance, if the shut-off circuit 230 interrupts the flow of power or liquids short-circuit the battery 210 itself, then the shut-off circuit power supply 232 would power the shut-off circuit 230, including the red indicator 236, and the liquid sensors 240. This power would allow the shut-off circuit 230 to continue to control the flow of power to the system circuit 290. If liquids are present within the portable device 200, then the red indicator 236 could continue to notify the user that turning on the portable device 200 could damage the system circuit 290.

The embodiment illustrated in FIG. 2 is illustrative only and in no way limits the scope of the present invention. In other embodiments, various modifications of the features and functions of the shut-off circuit 230, shut-off circuit power supply 232, and liquid sensors 240 are contemplated. For example, in other embodiments, the shut-off circuit power supply 232 may be located outside of the shut-off circuit 230 or there may be a shut-off circuit power supplies 232 coupled to each liquid sensor 240. Furthermore, in other embodiments, the liquid sensors 240 may be positioned at different locations within the portable device 200, such as proximate to the system circuit 290. Additionally, in other embodiments, the portable device 200 may be configured to prevent the user from turning the portable device 200 back on, if a liquid sensor 240 detects liquids within the portable device 200.

Figure 3:
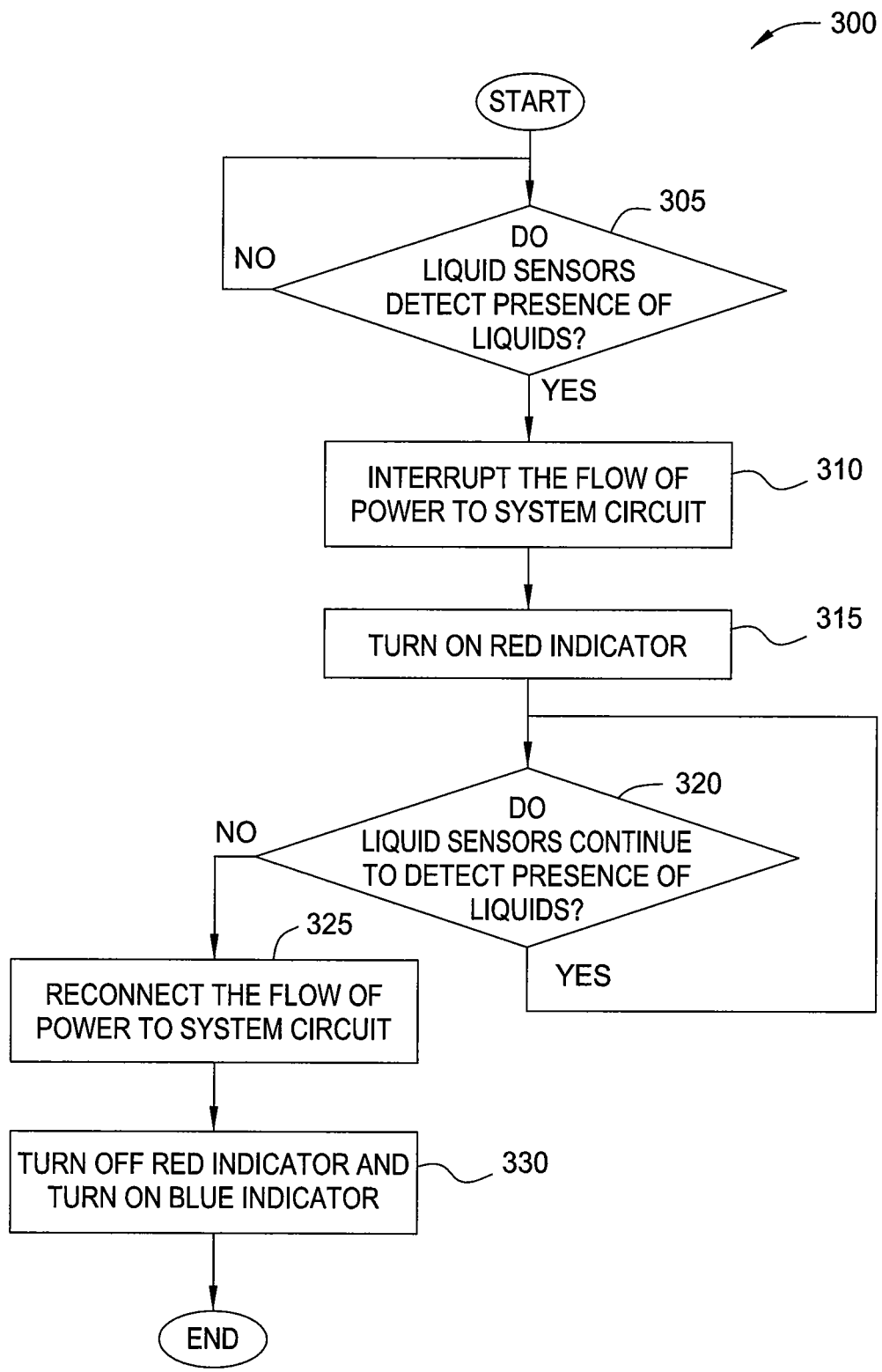
FIG. 3 illustrates a flow diagram of method steps for preventing the portable device of FIG. 2 from being damaged by the presence of liquids, according to one embodiment of the present invention.

FIG. 3 illustrates a flow diagram of method steps for preventing the portable device 200 of FIG. 2 from being damaged by the presence of liquids, according to one embodiment of the present invention Although the method steps are described in conjunction with the systems of FIGS. 1-2, persons skilled in the art will understand that any system configured to perform the method steps, in any order, is within the scope of the present invention.

As shown, a method 300 begins at step 305, where the shut-off circuit 230 within the portable device 200 determines if the liquid sensors 240 detect the presence of liquids within the portable device 200. The shut-off circuit 230 may receive a signal from a given liquid sensor 240 indicating the presence or absence of liquids at that liquid sensor 240. The shut-off circuit 230 may combine the signals from the liquid sensors 240 to produce a single indicator regarding the presence or absence of liquids within the portable device 200. If the shut-off circuit 230 receives signals indicating that liquids are not present from all of the liquid sensors 240, then the shut-off circuit 230 determines that liquids are not present within the portable device 200 and the method 300 repeats the step 305. Otherwise, if the shut-off circuit 230 receives a signal indicating that liquids are present from at least one liquid sensor 240, then the shut-off circuit 230 determines that liquids are present within the portable device 200 and the method 300 proceeds to step 310.

At step 310, the shut-off circuit 230 interrupts the flow of power to the system circuit 290 to avoid possible damage to the system circuit 290. Having determined that liquids are present within the portable device 200, the shut-off circuit 230 interrupts the flow of power to prevent possible damage to the system circuit 290 that may be caused by power flowing through short-circuits created by those liquids. The method 300 proceeds to step 315.

At step 315, the shut-off circuit 230 turns on the red indicator 236 to notify the user that liquids are present within the portable device 200. If the portable device 200 were powered on while the red indicator 236 is on and liquids are present within the portable device 200, then the system circuit 290 could be damaged. The method 300 proceeds to step 320.

At step 320, the shut-off circuit 230 determines if the liquid sensors 240 continue to detect the presence of liquids within the portable device 200. If the shut-off circuit 230 receives a signal indicating that liquids are present from at least one liquid sensor 240, then the shut-off circuit 230 determines that liquids continue to be present within the portable device 200 and the method 300 repeats the step 320. The shut-off circuit 230 continues to interrupt the flow of power to the system circuit 290 and keeps the red indicator 236 on. Otherwise, if the shut-off circuit 230 receives signals indicating that liquids are not present from all of the liquid sensors 240, then the shut-off circuit 230 determines that liquids are not longer present within the portable device 200 and the method 300 proceeds to step 325.

At step 325, the shut-off circuit 230 reconnects the flow of power to the system circuit 290. The shut-off circuit 230 may reconnect the flow of power without causing damage to the system circuit 290 because liquids are no longer present within the portable device 200. The method 300 proceeds to step 330.

At step 330, the shut-off circuit 230 turns off the red indicator 236 and turns on the blue indicator 234. The blue indicator 234 notifies the user that liquids are no longer present within the portable device 200 and if the user were to turn the portable device 200 on, then the system circuit 290 would not be damaged. The method 300 then ends.

In sum, the techniques disclosed above provide a shut-off circuit that interrupts the flow of power to the system circuit of a portable device when a liquid, such as water, is detected within the portable device. Liquid sensors are placed proximate to the ports of the portable device that may admit the flow of liquids, so that the passage of those liquids into the device may be detected. If the liquid sensors detect liquids entering the portable device, the shut-off circuit interrupts the flow of power from the battery to the system circuit.

Advantageously, the shut-off circuit protects the portable device from damage through exposure to liquids. More specifically, without power flowing to the system circuit, short-circuits, resulting from liquid exposure that could potentially damage electronic components or circuitry internal to the portable device, are prevented.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A method for preventing a portable computing device, comprising a system circuit, from being damaged by liquid, the method comprising:
    detecting, using at least one sensor, the presence of a liquid within the portable computing device; and
    in response, interrupting power flow to the system circuit via a shut-off circuit, wherein a first power supply supplies power to the system circuit and a second power supply supplies power to the shut-off circuit and the at least one sensor, wherein the second power supply and the first power supply comprise separate power supplies.

2. The method of claim 1, further comprising turning on a first indicator to indicate that the presence of a liquid within the portable computing device has been detected.

3. The method of claim 2, further comprising determining that the presence of the liquid within the portable computing device is no longer being detected.

4. The method of claim 3, further comprising re-establishing power flow to the system circuit via the shut-off circuit.

5. The method of claim 4, further comprising turning off the first indicator, and turning on a second indicator to indicate that the presence of the liquid within the portable computing device is no longer being detected.

6. The method of claim 1, wherein one or more sensors located proximate to one or more ports of the portable computing device are configured to detect the presence of liquid within the portable computing device.

7. The method of claim 6, wherein the one or more ports comprise at least one of a headphone port, a display port, a charger port, and a SIM card port.

8. A system configured to prevent a portable computing device, comprising a system circuit, from being damaged by liquid, the system comprising:
   at least one sensor configured to detect the presence of a liquid within the portable computing device;
   a shut-off circuit coupled to the at least one sensor and configured to interrupt power flow to the system circuit upon the presence of liquid within the portable computing device being detected;
   a first power supply that supplies power to the system circuit; and
   a second power supply that supplies power to the shut-off circuit and the at least one sensor, wherein the second power supply and the first power supply comprise separate power supplies.

9. The system of claim 8, wherein the shut-off circuit is further configured to turn on a first indicator to indicate that the presence of a liquid within the portable computing device has been detected.

10. The system of claim 9, wherein the shut-off circuit is further configured to determine that the presence of the liquid within the portable computing device is no longer being detected by the at least one sensor.

11. The system of claim 10, wherein the shut-off circuit is further configured to re-establish power flow to the system circuit.

12. The system of claim 11, wherein the shut-off circuit is further configured to turn off the first indicator, and to turn on a second indicator to indicate that the presence of the liquid within the portable computing device is no longer being detected by the at least one sensor.

13. The system of claim 8, wherein the at least one sensor is located proximate to at least one port of the portable computing device.

14. The system of claim 13, wherein the at least one port comprises at least one of a headphone port, a display port, a charger port, and a SIM card port.

15. A portable computing device, comprising:
   a system circuit;
   at least one sensor configured to detect the presence of a liquid within the portable computing device;
   a shut-off circuit coupled to the at least one sensor and the system circuit and configured to interrupt power flow to the system circuit upon the presence of liquid within the portable computing device being detected;
   a first power supply that supplies power to the system circuit; and
   a second power supply that supplies power to the shut-off circuit and the at least one sensor, wherein the second power supply and the first power supply comprise separate power supplies.

16. The portable computing device of claim 15, wherein the at least one sensor resides proximate to at least one of a headphone port, a display port, a charger port, and a SIM card port.

* * * * *